(12) United States Patent
Back

(10) Patent No.: US 10,619,792 B2
(45) Date of Patent: Apr. 14, 2020

(54) MOBILE SECONDARY CHEMICAL CONTAINMENT/DRIP PAN

(71) Applicant: Andrew Patrick Back, Fairbanks, AK (US)

(72) Inventor: Andrew Patrick Back, Fairbanks, AK (US)

(*) Notice: Subject to any disclaimer, the term of this patent is extended or adjusted under 35 U.S.C. 154(b) by 23 days.

(21) Appl. No.: 16/045,348

(22) Filed: Jul. 25, 2018

(65) Prior Publication Data

US 2019/0040999 A1 Feb. 7, 2019

Related U.S. Application Data

(60) Provisional application No. 62/541,572, filed on Aug. 4, 2017, provisional application No. 62/545,318, filed on Aug. 14, 2017.

(51) Int. Cl.
*F16N 31/00* (2006.01)

(52) U.S. Cl.
CPC ................... *F16N 31/002* (2013.01)

(58) Field of Classification Search
CPC ........... F16N 31/00–002; F16N 31/004; F16N 31/006; F16N 2031/008; F16N 31/02; F16N 2031/025; B65D 23/06; B65D 81/26; B65D 81/261; B65D 2231/025
See application file for complete search history.

(56) References Cited

U.S. PATENT DOCUMENTS

| | | | | |
|---|---|---|---|---|
| 5,071,027 A | * | 12/1991 | Sullivan | F24F 13/22 141/86 |
| 5,143,178 A | * | 9/1992 | Latham, Jr. | F16N 31/002 141/340 |
| 5,964,370 A | * | 10/1999 | Rust, Jr. | F24F 1/0007 220/571 |
| 6,988,848 B2 | * | 1/2006 | Arsenault | F16N 31/006 180/69.1 |
| 9,187,239 B2 | * | 11/2015 | Buck | B65D 90/24 |
| 9,303,816 B1 | * | 4/2016 | Browning | B65D 90/24 |
| 2012/0031910 A1 | * | 2/2012 | Hogestyn | A47J 36/2477 220/573.1 |
| 2012/0312821 A1 | * | 12/2012 | Matson | F16N 31/00 220/573 |

* cited by examiner

Primary Examiner — Kareen K Thomas
(74) Attorney, Agent, or Firm — Davis Wright Tremaine LLP; George C. Rondeau, Jr.

(57) ABSTRACT

A chemical containment pan for use with a corner and side locking connectors having locking inserts. The pan has four sidewalls and a bottom wall, with each sidewall having a top rail portion with two having top rail extension portion with a downwardly extending outer flange portion which overlap an adjacent pan. Each of the top rail corner portions has a corner aperture sized to removably receive one insert of the corner connector to lock two or four adjacent pans together. Each top rail portion has a midportion aperture sized to removably receive one insert of the side connector to lock two side-by-side pans together.

15 Claims, 6 Drawing Sheets

US 10,619,792 B2

MOBILE SECONDARY CHEMICAL CONTAINMENT/DRIP PAN

BACKGROUND OF THE INVENTION

Field of the Invention

The present invention is directed generally to oil and other chemical containment pans, and more particularly to mobile secondary chemical containment/drip pans.

Description of the Related Art

Oil and other chemical containment ponds or pans on the market today are not environmentally friendly and have a high failure rate. The wind can blows them out onto the tundra or a field where a person is not allowed to go to pick them up, so they biodegrade where the land and allow chemicals to enter the environment. That's bad for the environment and wildlife. It also results in companies getting massive fines. If run over by a vehicle a puncture hole may result, again allowing chemicals to touch the ground and have to be picked up and properly removed by a hazmat team, which is a very costly procedure. If the vehicle drags the pan, it will too quickly create a hole and again leak chemicals onto the ground.

Containment pans on the market today usually typically have no drains or other good way to get the chemicals out of the pans. This lead to expensive cleanup methods using absorbent materials which have to be incinerated or otherwise properly disposed.

Most containment pans on the market today are composed of a fabric which takes in excessive amount of time to cut and fold together to manufacture the containment pan.

The present avoids these problems and provides other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
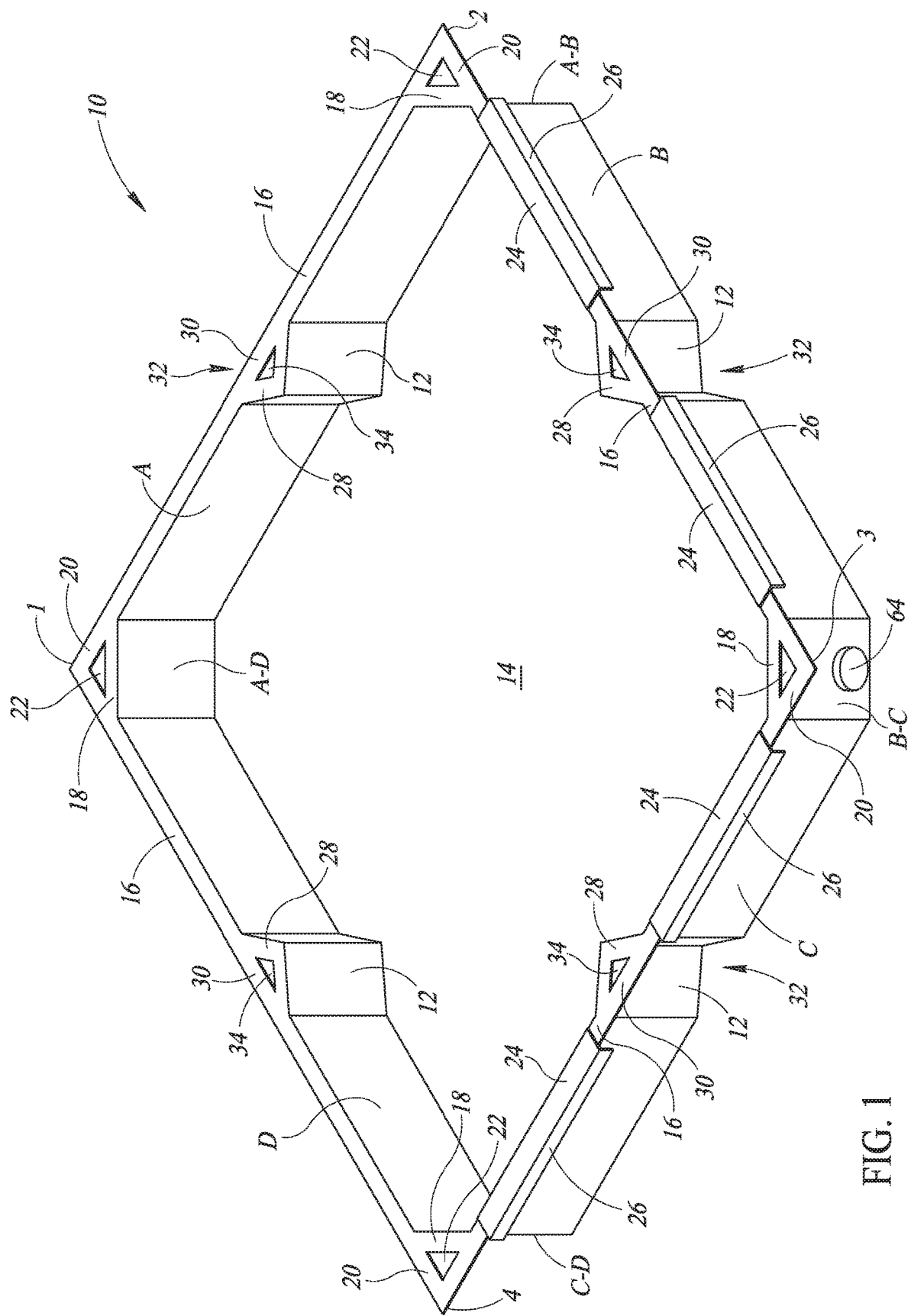
FIG. 1 is a perspective view of a first embodiment of a mobile secondary chemical containment/drip pan.

The invention is a Mobile secondary oil or other chemical containment/drip pan 10. As shown in FIG. 1, the pan is built square in shape. Using the orientation of FIG. 1, a top pan sidewall is labeled "A", a right hand pan sidewall is labeled "B", a bottom pan sidewall is labeled "C" and a left pan sidewall is labeled "D". Sidewalls A and C are opposite and parallel to each other, and sidewalls B and D are opposite and parallel to each other to define the generally square shape of the pan 10. The sidewalls A, B, C and D are connect at their lower ends to a floor 14 to define a fluid-tight pan container with an open upper end.

The sidewalls A and D meet at a sidewall corner portion A-D which extends at a slant angle of 135 degrees relative to each of sidewalls A and D, the sidewalls A and B meet at a sidewall corner portion A-B which extends at a slant angle of 135 degrees relative to each of sidewalls A and B, the sidewalls B and C meet at a sidewall corner portion B-C which extends at a slant angle of 135 degrees relative to each of sidewalls B and C, and the sidewalls C and D meet at a sidewall corner portion C-D which extends at a slant angle of 135 degrees relative to each of sidewalls C and D. Each of the sidewalls A, B, C and D has an inwardly projecting V-shaped sidewall midportion 12 located mid-way along the sidewall.

An upper portion of each of sidewalls A, B, C and D has a flange or top rail 16 extending along the length of the sidewall. The top rails 16 of each of the sidewalls A, B, C and D extends along the top of the sidewall corner portions A-D, A-B, B-C and C-D to define an inward corner top rail portion 18 and also extend outward beyond the sidewalls at the corners to define an outward corner top rail portion 20 which bridges over an outward recess thereunder. The inward corner top rail portion 18 and the outward corner top rail portion 20 define a triangular shaped hole 22 therebetween which is located above the recess, with each of the four holes 22 located outward of one of the correspondingly located sidewall corner portions A-D, A-B, B-C and C-D.

The inward corner top rail portion 18 and the outward corner top rail portion 20 where the sidewalls A and D meet define a top rail corner portion 1, the inward corner top rail portion 18 and the outward corner top rail portion 20 where the sidewalls A and B meet to define a top rail corner portion 2, the inward corner top rail portion 18 and the outward corner top rail portion 20 where the sidewalls B and C meet to define a top rail corner portion 3, and the inward corner top rail portion 18 and the outward corner top rail portion 20 where the sidewalls C and D meet to define a top rail corner portion 4. Each of the four holes 22 are locate at one of top rail corner portions 1, 2, 3 and 4. The top rail 16 of each of the sidewalls A, B, C and D includes outwardly located portions arranged in a straight line and extending fully between the top rail corner portions at the ends of the sidewall.

The top rail 16 of sidewalls B and C each have two top rail extension portions 24 which are sized to extend laterally outward sufficiently to overlap the top rails 16 of sidewalls D and A, respectively, when multiple pans 10 are assembled with the sidewall B of one pan positioned adjacent to the sidewall D of another pan, or with the sidewall C of one pan positioned adjacent to the sidewall A of another pan. Each of the top rail extension portions 24 has a downwardly extending outer flange portion 26 which, when sidewall B is positioned adjacent to sidewall D, the outer flange portion 26 of top rail extension portion 24 of sidewall B extends downward inward of the inward edge of top rail 16 of sidewall D, and when side C is positioned adjacent to sidewall A, the outer flange portion 26 of top rail extension portion 24 of sidewall C extends downward inward of the inward edge of top rail 16 of sidewall A. In such manner, the sides A-D of any desired number of adjacent pans may be locked together.

The top rail 16 of each of the sidewalls A, B, C and D extends along the top of the V-shaped sidewall midportion 12 to define an inwardly projecting V-shaped top rail portion 28 and also has a bridge top rail portion 30 which bridges over an outward recess thereunder formed by the V-shaped sidewall portion. The V-shaped top rail portion 28 and the bridge top rail portion 30 define a triangular shaped hole 34 therebetween which is located above the recess, with the hole 34 located outward of one of the correspondingly located V-shaped sidewall midportions 12. The holes 22 in the top rail 16 at each of the top rail corner portions 1, 2, 3 and 4, and the holes 34 in the top rail 16 at each of the V-shaped sidewall midportions 12 are provided for the insertion of locking connectors, as will be described in greater detail below. There are three separate styles of locking connectors that are needed to lock all the various combinations of the adjacent pans 10 together using however many pans are needed.

Figure 2A:
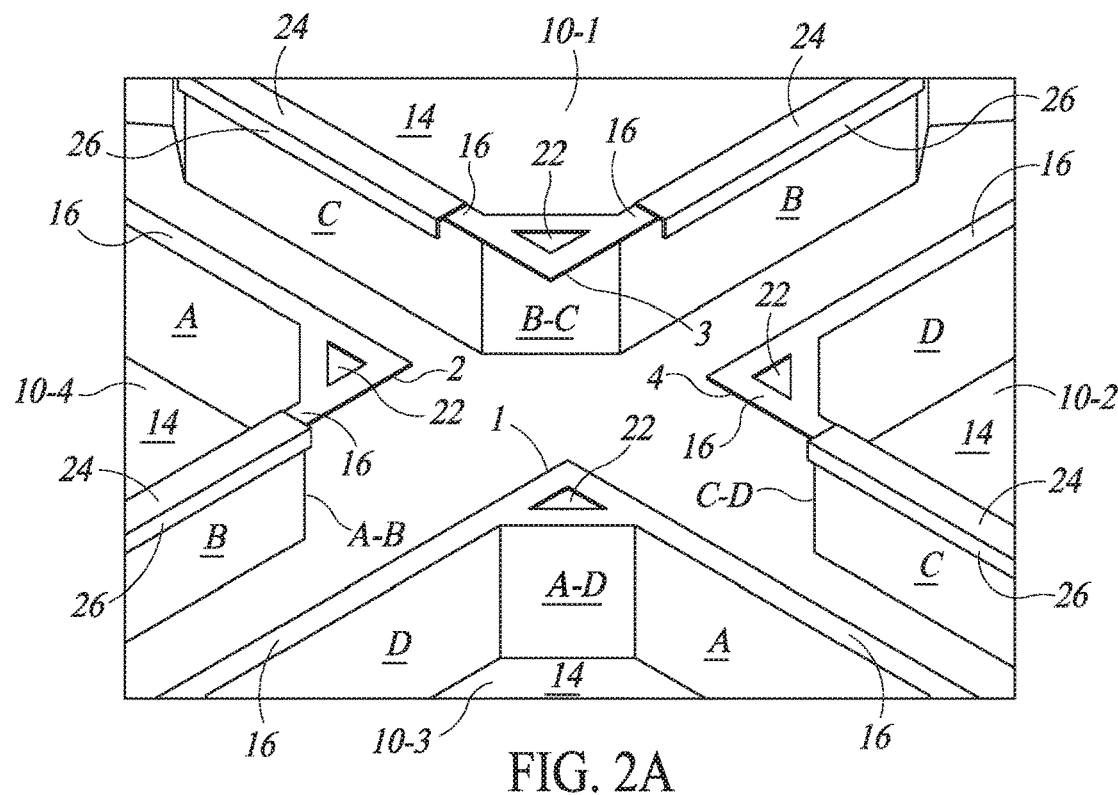
FIG. 2A is a perspective view of four pans of the type shown in FIG. 1 positioned prior to their adjacent corners being locked together.
Figure 2B:
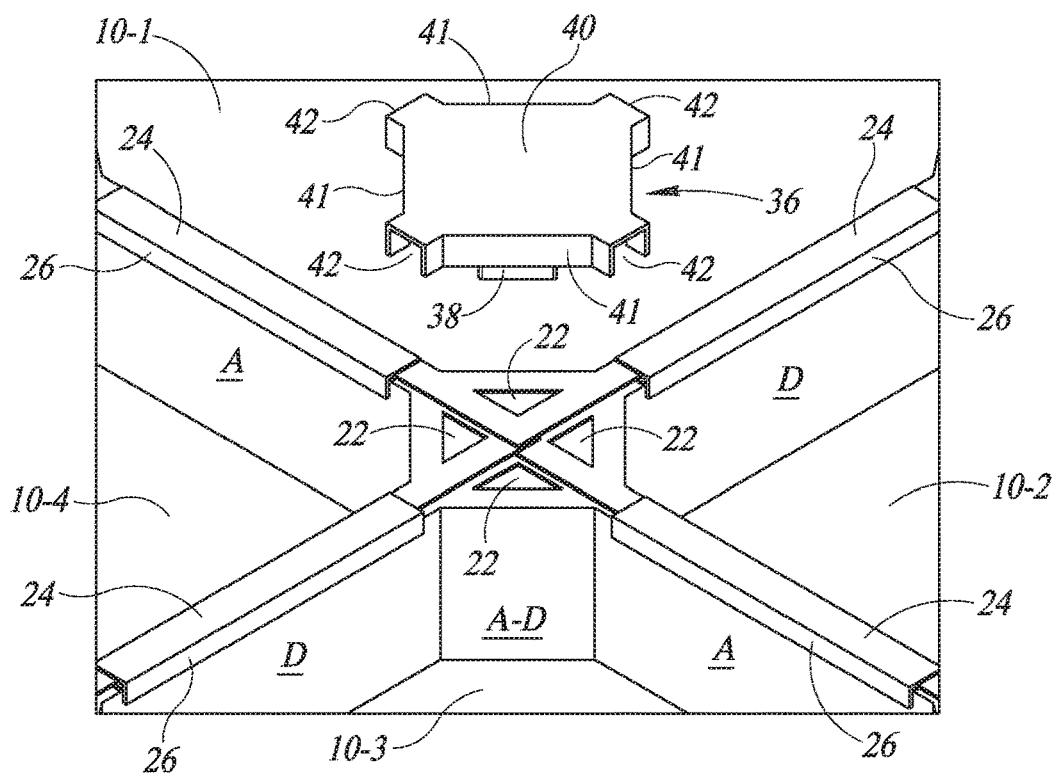
FIG. 2B is a perspective view of the four pans of FIG. 2A with their adjacent corners overlapping prior to being locked together.
Figure 2C:
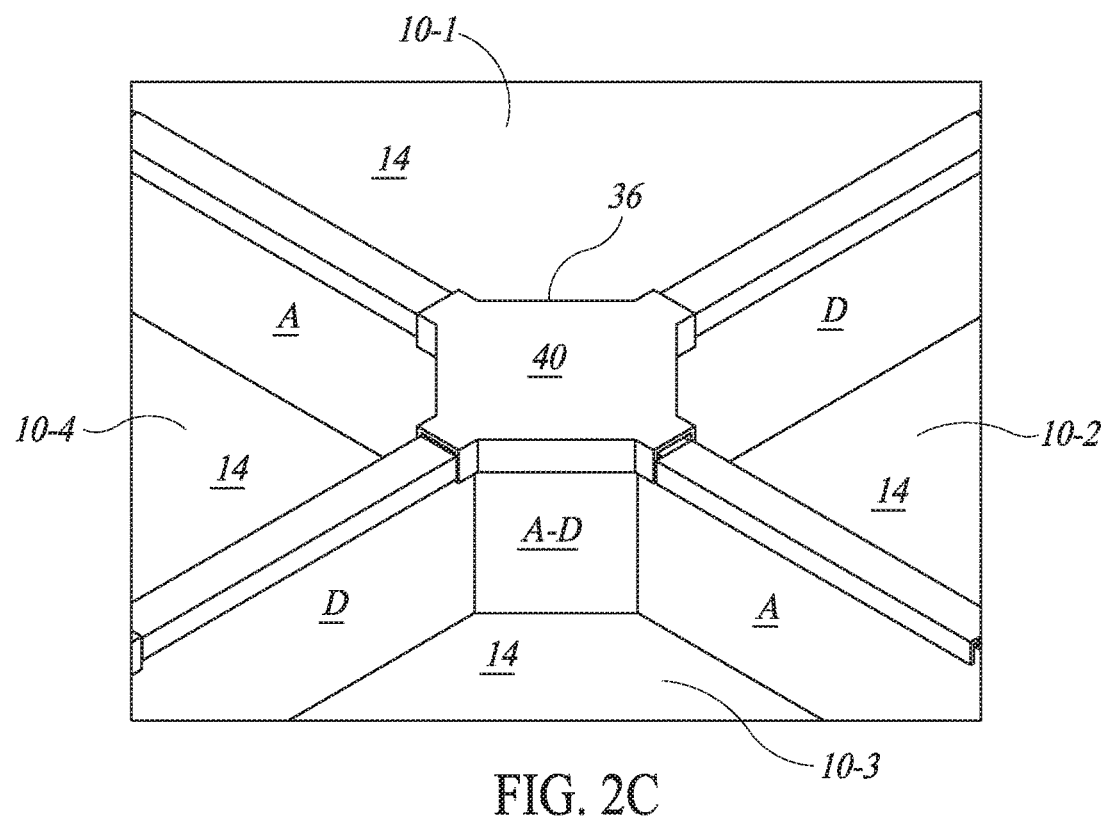
FIG. 2C is a perspective view of the four pans of FIG. 2B with their adjacent corners locked together using a four-corner connector.
Figure 6:
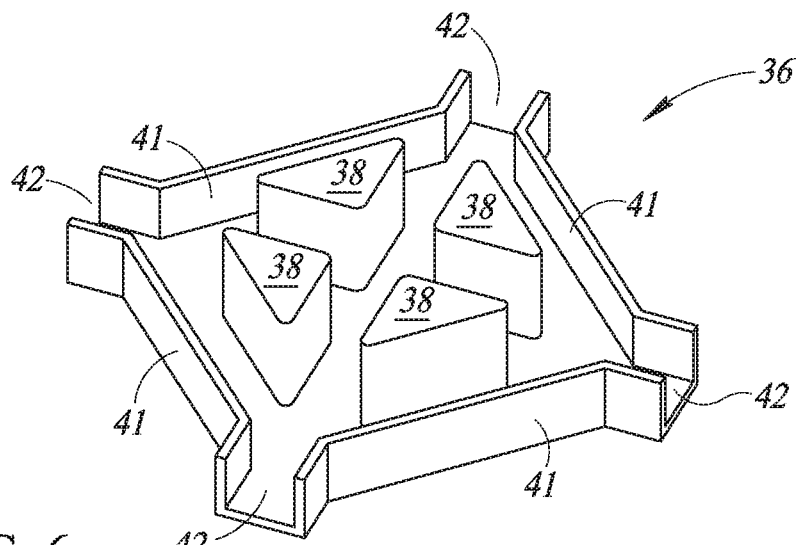
FIG. 6 is a bottom plan view of the two-corner connector of FIGS. 3B and 3C.

A locking connector 36 is shown in FIGS. 2B, 2C and 6 for use when four pans 10 (identified as 10-1, 10-2, 10-3 and 10-4) are to be locked together at their adjacent corner portions 1, 2, 3 and 4. The four pans are assembled with the sidewall C of pan 10-1 positioned adjacent to sidewall A of pan 10-4, the sidewall B of pan 10-1 positioned adjacent to sidewall D of pan 10-2, the sidewall C of pan 10-2 positioned adjacent to sidewall A of pan 10-3, and the sidewall D of pan 10-3 positioned adjacent to sidewall B of pan 10-4. FIG. 2A shows the four pans arranged prior to bringing them into the positions shown in FIG. 2B where the four are positioned adjacent to each other for connection with the locking connector 36. In such configuration the corner portion 3 of the pan 10-1, the corner portion 4 of the pan 10-2, the corner portion 1 of the pan 10-3, and the corner portion 2 of the pan 10-4 overlap and their holes 22 are arranged in a cross-shaped pattern. The locking connector 36 has four downwardly extending projections 38 arranged so each of the projections can be inserted into one of the four holes 22 to lock the four pans together and provide a leak proof and tight fit which keeps the pans from separating. A top connector portion 40 of the locking connector 36 which has four downwardly extending sidewalls 41 serves as a cover or shield to direct any fluid dripping down at the corners into one of the four pans. The top connector portion 40 has four side openings 42 arranged in a cross-shaped pattern, each to receive therein the overlapping top rails 16 of the four pans, as shown in FIG. 2C.

Further, when the locking connector 36 is installed, the top rail extension portion 24 of the side wall B of pan 10-1 extends over the top rail 16 of sidewall D of pan 10-2, the top rail extension portions 24 of the side wall C of pan 10-1 extends over the top rail 16 of sidewall A of pan 10-4, the top rail extension portions 24 of the side wall C of pan 10-2 extends over the top rail 16 of sidewall A of pan 10-3, and the top rail extension portions 24 of the sidewall B of pan 10-4 extends over the top rail 16 of sidewall D of pan 10-3, the top rail extension portions 24 serve as covers or shield to direct any fluid dripping down on them into one of the four pans.

Figure 3A:
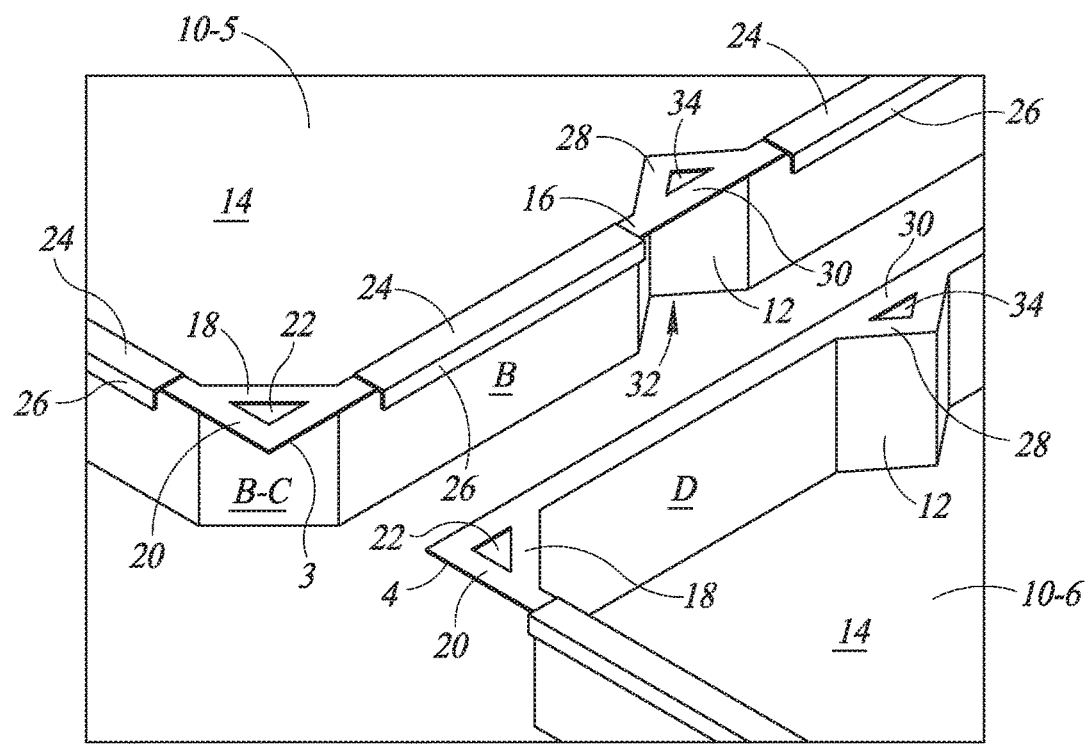
FIG. 3A is a perspective view of two pans of the type shown in FIG. 1 positioned prior to their adjacent sides and two adjacent corners being locked together.
Figure 3B:
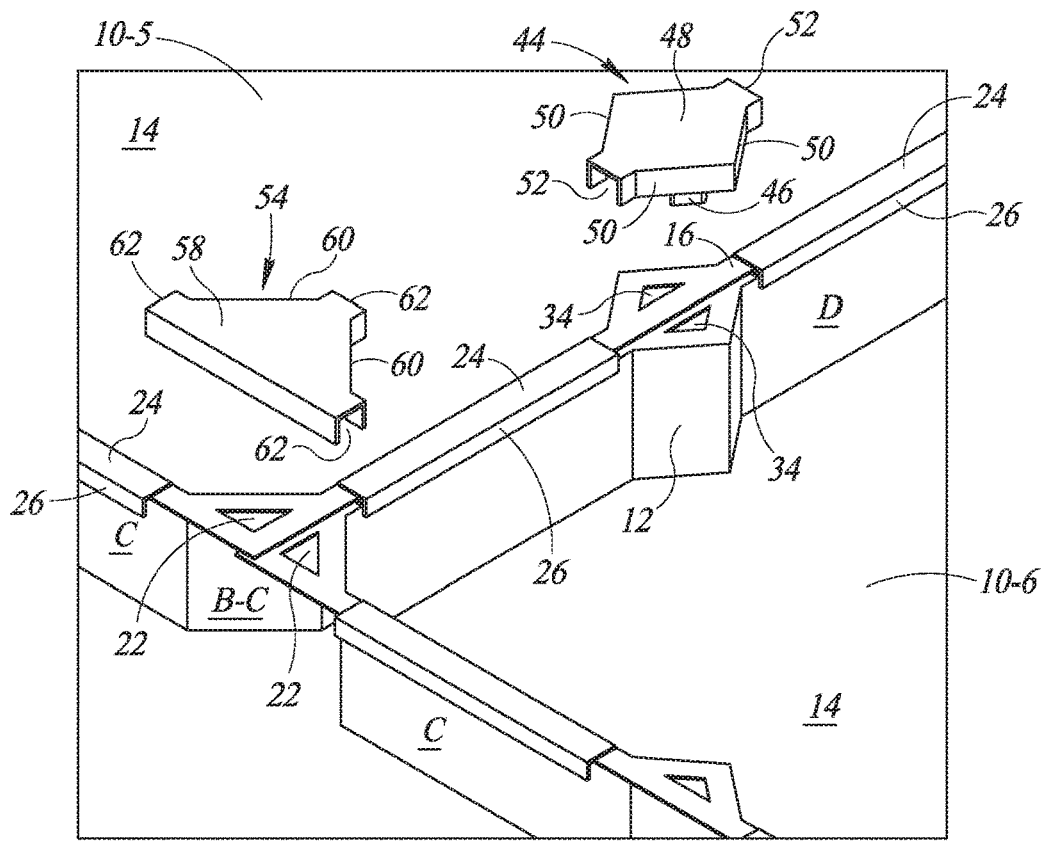
FIG. 3B is a perspective view of the two pans of FIG. 3A with their adjacent sides and two adjacent corners overlapping prior to being locked together.
Figure 3C:
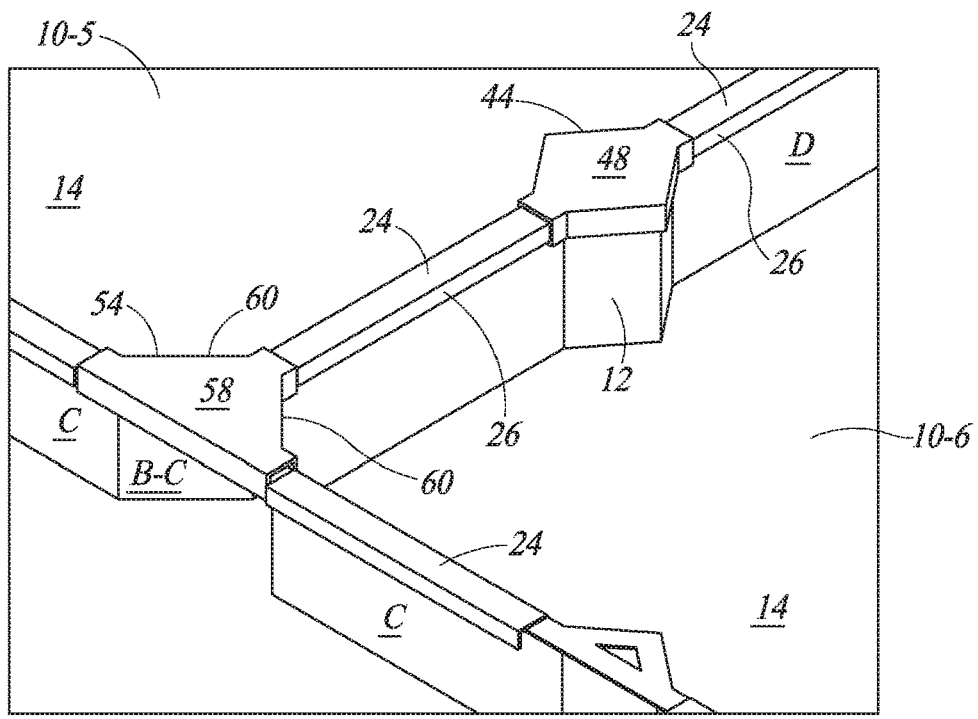
FIG. 3C is a perspective view of the two pans of FIG. 3B with their adjacent sides and two adjacent corners locked together using a two-side connector and a two-corner connector.
Figure 7:
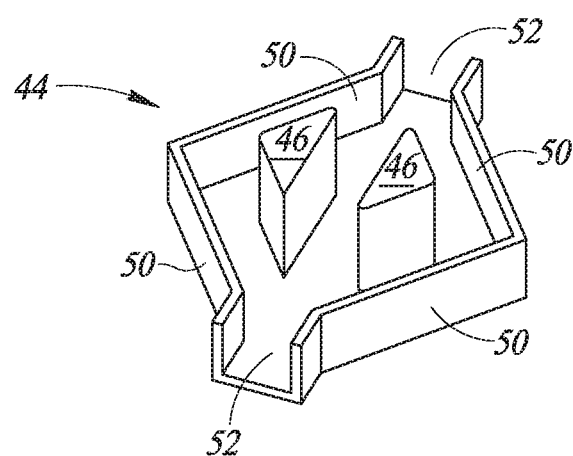
FIG. 7 is a bottom plan view of the two-side connector of FIGS. 3B and 3C.
Figure 8:
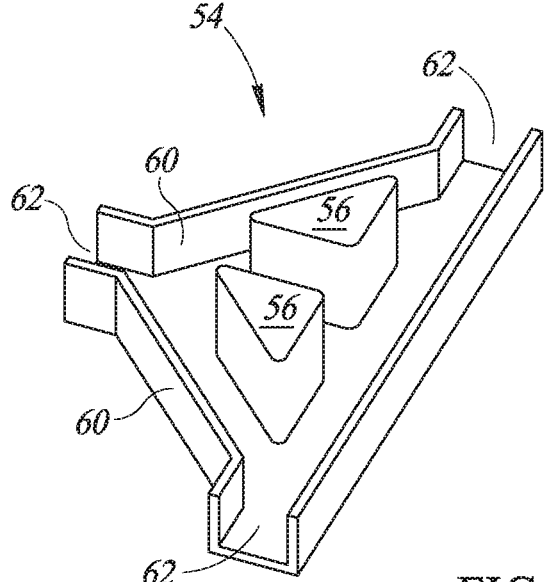
FIG. 8 is a bottom plan view of the four-corner connector of FIGS. 2B and 2C.

The locking together of two side-by-side pans, such as pans 10-5 and 10-6 by way of example, using the holes 34 in the top rails 16 at the V-shaped sidewall midportions 12 is shown in FIGS. 3A-3C. A locking connector 44 is shown in FIGS. 3B, 3C and 7 with two downwardly extending projections 46 arranged so each of the projections can be inserted into one of the two holes 34 to lock the two pans together and provide a leak proof and tight fit which keeps the pans from separating. A diamond shaped top connector portion 48 of the locking connector 44 which has four downwardly extending sidewalls 50 serves as a cover or shield to direct any fluid dripping down at the V-shaped sidewall midportions 12 into one of the two pans. The top connector portion 48 has two side openings 52 arranged in a straight line pattern, each to receive therein the overlapping top rails 16 of the two pans, as shown in FIG. 3C.

The locking together of two side-by-side pans, again such as pans 10-5 and 10-6 by way of example, using the holes 22 in the top rails 16 at the adjacent corner portions 3 and 4 is shown in FIGS. 3A-3C. A locking connector 54 is shown in FIGS. 3B. 3C and 8 with two downwardly extending projections 56 arranged so each of the projections can be inserted into one of the two holes 22 to lock the two pans together and provide a leak proof and tight fit which keeps the pans from separating. A top connector portion 58 of the locking connector 54 which has two downwardly extending sidewalls 60 serves as a cover or shield to direct any fluid dripping down at the adjacent corner portions 3 and 4 into one of the two pans. The top connector portion 58 has three side openings 62 arranged in a T-pattern, two to receive therein the top rail 16 of one of the two pans and one to receive therein the overlapping top rails of the two pans, as shown in FIG. 3C.

Figure 4:
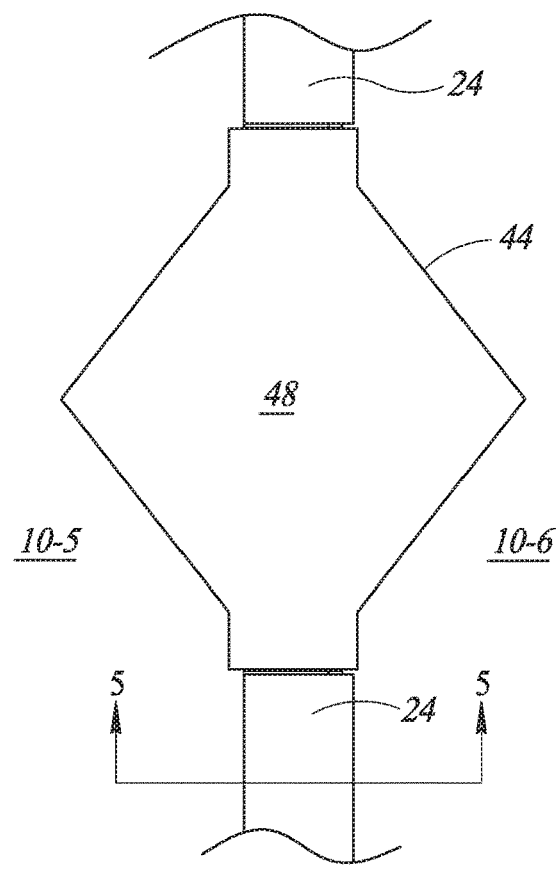
FIG. 4 is a top plan view of the two-side connector of FIG. 3C.
Figure 5:
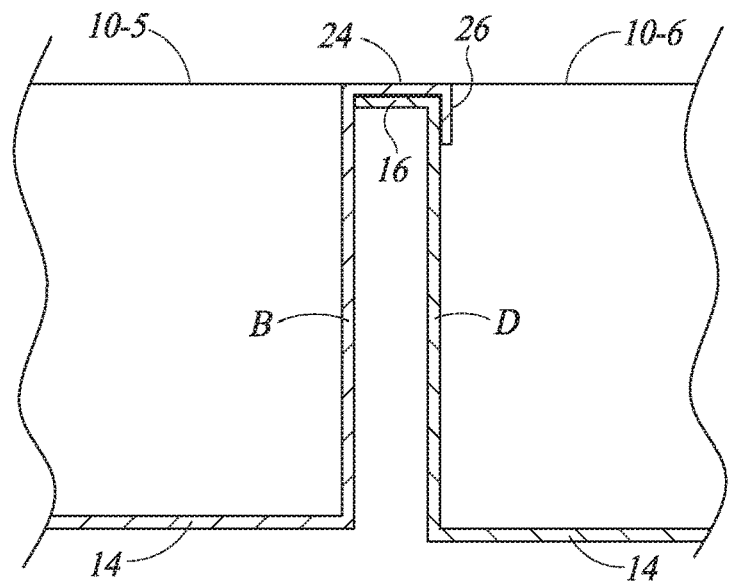
FIG. 5 is a cross-sectional view taken substantially along the line 5-5 of FIG. 4 illustrating the overlapping two top flanges of the two side-by-side pans of FIG. 3C.

FIG. 4 is a top plan view of the locking connector 44 of FIG. 3C, and shows the top rail extension portions 24 of sidewall B of pan 10-5 overlapping the top rail 16 of sidewall D. FIG. 5 is a cross-sectional view taken substantially along the line 5-5 of FIG. 4 illustrating the top rail extension portions 24 of sidewall B of pan 10-5 overlapping the top rail 16 of sidewall D of the two side-by-side pans 10-5 and 10-6 of FIG. 3C, with the outer flange portion 26 of top rail extension portion 24 of sidewall B of pan 10-5 extending downward inward of the inward edge of top rail 16 of sidewall D of pan 10-6.

The locking connectors 36, 44 and 54 help prevent any leakage onto the ground and further permit locking together multiple pans 10 even more so than would the use of overlaying hooks on the pans.

When a pan 10 is used by itself, the holes 22 and 34 provide a stable and balanced way to tie the pan underneath a vehicle so it can be used while driving or secured at night without concern of being blown away by high winds.

As shown in FIG. 1, at one of sidewall corner portion B-C an optional drain fitting 64 is provided. In this way, the pans 10 can be drained one by one as they are unlocked from the others as part of the cleanup and removal of any hazardous waste. The drain allows a pump to be connected which is standard in oil fields which eliminates the cost of expensive disposal fees from rags used to clean the oil and chemicals, not to mention avoiding the risk of spilling chemicals on the ground.

The size of each pan 10 may vary upon customers request but all pads overlap and lock together in the same way. The same locking connectors 36, 44 and 54 may be used with all pans 10 no matter of the whether the pan is 18"×18" or 10'×10'.

The pans 10 may be made with a polyurea polyurethane mixture but are also may be made from pure polyurea or polyurethane or other flexible spray coatings. This allows the pan's construction to suit the customer for their chemicals. Some of these are environmentally green products that are none biodegradable. They're flexible when in sub-zero temperatures without cracking or failing. A goal is to make the pan 10 out of environmentally green products and virtually indestructible, eliminating hazardous waste from touching the ground and outlasting what is available on the market today. The market today is basically one job use pan which gets thrown away and which creates a lot of waste because new ones have to be made constantly, which in turn introduces more hazardous materials to the environment.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

The invention is not limited except as by the appended claims.

The following is the original written description:

Product Description

Product is a Mobile secondary oil containment. They're built square in shape. the top is labeled A right hand side labeled B the bottoms labeled C and the right size label D. Top left hand corner Is labeled 1 top right-hand corner labeled 2 bottom right hand corner is labeled 3 bottom left hand corner is labeled 4. On Side B and C the top rail is s taller wider and has an overhang to overlap Side A and D to be able to lock together an infinite number of containment ponds. In the four corners of the containment ponds have been modified too 45° angle's on the top rail it has been left the same size as the 90° corners would've been. Along the sides in middle of the rails there are support cut in towards the middle of a containment pond a couple inches. The top rail has been left alone around the hole containment making flat solid triangles in the four corners and therefore indents in the middle where holes will be drilled for the insertion locking mechanisms. There are three separate locking mechanisms that are needed to lock the containments together. They prevent any leakage onto the ground and further locked together the containment ponds even more so that the over laying hooks on the containment ponds. On the corner that is labeled one there is an optional drain fitting added. It is designed in conjunction the locking mechanisms being on the opposite corner. This way you can drain the containment ponds one by One and unlock them as you go along with the cleanup and removal of any hazardous waste. the size of each containment pond may vary upon customers request but all container ponds overlap and lock together in the same way. Locking pins are Universal throughout containment ponds. No matter of the containment pond is 18"×18" or 10'×10'.

The majority of these containment ponds are made with a polyurea polyurethane mixture but are also made from pure Polyurea or polyurethane or other flexible spray coatings. Allowing us the build to suit the customer for their chemicals they aren't trying to contain. Some of these are environmentally green Products that are none biodegradable. They're flexible when there and sub-zero temperatures without cracking for failing. The secondary containment pond on the market today are not environmentally friendly which causes a big problem when the wind blows them out into the tundra or in to the field where you're not allowed to go to pick them up and they biodegrade. That's bad for the environment and wildlife companies get massive finds. The containment bonds on the market today have a high failure rate. If you run them over with a vehicle picking puncture hole and allow chemicals to touch the ground which than have to be picked up and removed properly by hazmat team very costly procedure if you drag them they will get a hole as well. We've done side-by-side testing oh Dragging arcing tampons find a truck with the tiring room minute side-by-side with what's on the market the containment bonds are available today made it a quarter mile the container bonds that we're making went miles with showing no signs of wear you can drive overarching new burnout on them spent another back they will not fail which helps illuminate any chance of chemical waste reaching the ground this means ours will last years, years and years longer than theirs better basically disposable after every job because they're so poorly made. There's no drains are good way to get the oil out of the container ponds on the market where to lead you too expensive cleanup methods using absorbs in those have to be incinerated disposed of properly thinking came in units that we have are designed to be outfitted with a drain System that you can hook to a pump which is standard on mindsets in oil fields eliminating the cost of expensive disposal fees from rags 20 clean the oil and chemicals not to mention the risk of spilling oil on the ground. Secondary containment are made to protect the environment the containment bonds on the market today are made of hazardous materials themselves.

Two holes and leaks. Our goal as to make the containment on out of environmentally green products and virtually indestructible eliminating hazardous waste to touch the ground and to outlast what is on the market today. Payment on The market today are basically one job used tool and get thrown away which creates a lot of waste because new ones have to be made constantly which is intern introducing more hazardous materials to the environment that's unacceptable.

Most containment on the market today are composed of a fabric takes in excess of amount of time to cut and fold so together the containment ponsit we came up with are manufactured by spraying the product laundry mold which cuts manufacturing time Down to almost nothing you'll be older get the product out of the field where it belongs way faster then the standard manufacturing method used today.

The locking pads come in three varieties universal to all of our secondary containments. All have been designed to overhang the edges of each duck Pond and they have pins on one side that go through the holes that have been made in the containment in ponds. These ensure a leak proof and tight fit to keep containment pond from falling apart when locked together.

The four-way locking pad is designed to lock for containment policy together making a bigger square. It has four separate pins on one that go through the four separate containment ponds.

The mid rail locking pad has two pins in it and is a Diamond shape.

The corner Locking pad also has two pins and it is use to conjoin the two corners of separate containment ponds together it has more of a triangle shape to it.

When the Containment units are used by themselves the holes where the locking pins go through are a key component. They make a stable and balanced way to tie off too to Secure the containment pond underneath a vehicle so can be used while driving or secured at night without concern of being blown away and High winds.

The invention claimed is:

1. A chemical containment pan for use with a corner locking connector having four locking inserts, comprising:
a first sidewall having first and second end portions, and upper and lower portions;
a second sidewall opposite the first sidewall, the second sidewall having first and second end portions, and upper and lower portions;
a third sidewall having first and second end portions, and upper and lower portions, the third sidewall extending between the first end portion of the first sidewall and the first end portion of the second sidewall, the first end portion of the third sidewall being connected in fluid-tight arrangement to the first end portion of the first sidewall and the second end portion of the third sidewall being connected in fluid-tight arrangement to the first end portion of the second sidewall;
a fourth sidewall having first and second end portions, and upper and lower portions, the fourth sidewall extending between the second end portion of the first sidewall and the second end portion of the second sidewall, the first end portion of the fourth sidewall being connected in fluid-tight arrangement to the second end portion of the first sidewall and the second end portion of the fourth sidewall being connected in fluid-tight arrangement to the second end portion of the second sidewall;
a bottom wall in fluid-tight arrangement with the lower portions of the first, second, third and fourth sidewalls to define an interior fluid-tight container with an upward opening, open top defined by the upper portions of the first, second, third and fourth sidewalls;
the upper portions of each of the first, second, third and fourth walls having a top rail portion;
the first end portion of the top rail portion of the first sidewall and the first end portion of the top rail portion of the third sidewall defining a top rail first corner portion, the second end portion of the top rail portion of the first sidewall and the first end portion of the top rail portion of the fourth sidewall defining a top rail second corner portion, the second end portion of the top rail portion of the fourth sidewall and the second end portion of the top rail portion of the second sidewall defining a top rail third corner portion, and the first end portion of the top rail portion of the second sidewall and the second end portion of the top rail portion of the third sidewall defining a top rail fourth corner portion, each of the first, second, third and fourth corner portions having a corner aperture, each corner aperture being sized to removably receive one of the locking inserts of the corner locking connector; and
the chemical containment pan being constructed such that when the fourth sidewall a first chemical containment pan and the third sidewall of a second chemical containment pan are positioned adjacent to each other, the second sidewall of the second chemical containment pan and a first sidewall of a third chemical containment pan are positioned adjacent to each other, the third sidewall of the third chemical containment pan and the fourth sidewall of a fourth chemical containment pan are positioned adjacent to each other and the first sidewall of the fourth chemical containment pan and the second sidewall of the first chemical containment pan are positioned adjacent to each other, the corner apertures of the third corner portion of the first chemical containment pan, the fourth corner portion of the second chemical containment pan, the first corner portion of the third chemical containment pan and the second corner portion of the fourth chemical containment pan are positioned adjacent to each other in position to each receive one of the four locking inserts of the corner locking connector.

2. The chemical containment pan of claim 1, wherein the top rail portion of the second sidewall has a top rail extension portion with a downwardly extending outer flange portion and the top rail portion of the fourth sidewall has a top rail extension portion with a downwardly extending outer flange portion; and
the chemical containment pan being constructed such that when the fourth sidewall of the first chemical containment pan and the third sidewall of the second chemical containment pan are positioned adjacent to each other, the second sidewall of the second chemical containment pan and the first sidewall of the third chemical containment pan are positioned adjacent to each other, the third sidewall of the third chemical containment pan and the fourth sidewall of the fourth chemical containment pan are positioned adjacent to each other and the first sidewall of the fourth chemical containment pan and the second sidewall of the first chemical containment pan are positioned adjacent to each other, the top rail extension portion of the fourth sidewall of the first chemical containment pan extends over the top rail portion of the third sidewall of the second chemical containment pan and the downwardly extending outer flange portion of the top rail extension portion of the fourth sidewall of the first chemical containment pan is position over the interior fluid-tight container of the second chemical containment pan, the top rail extension portion of the second sidewall of the second chemical containment pan extends over the top rail portion of the first sidewall of the third chemical containment pan and the downwardly extending outer flange portion of the top rail extension portion of the second sidewall of the second chemical containment pan is position over the interior fluid-tight container of the third chemical containment pan, the top rail extension portion of the fourth sidewall of the fourth chemical containment pan extends over the top rail portion of the third sidewall of the third chemical containment pan and the downwardly extending outer flange portion of the top rail extension portion of the fourth sidewall of the fourth chemical containment pan is position over the interior fluid-tight container of the third chemical containment pan and the top rail extension portion of the second sidewall of the first chemical containment pan extends over the top rail portion of the first sidewall of the fourth chemical containment pan and the downwardly extending outer flange portion of the top rail extension portion of the second sidewall of the first chemical containment pan is position over the interior fluid-tight container of the fourth chemical containment pan.

3. The chemical containment pan of claim 1, wherein the first end portion of the first sidewall and the first end portion of the third sidewall meet at a first sidewall corner portion and define a first sidewall corner portion at a slant angle to adjacent portions of both the first and third sidewalls, and the corner aperture of the top rail first corner portion is positioned outward of first sidewall corner portion, the second end portion of the first sidewall and the first end portion of the fourth sidewall meet at a second sidewall corner portion and define a second sidewall corner portion at a slant angle to adjacent portions of both the first and fourth sidewalls, and the corner aperture of the top rail second corner portion is positioned outward of second sidewall corner portion, the second end portion of the fourth sidewall and the second end portion of the second sidewall meet at a third sidewall corner portion and define a third sidewall corner portion at a slant angle to adjacent portions of both the fourth and second sidewalls, and the corner aperture of the top rail third corner portion is positioned outward of third sidewall corner portion, and the first end portion of the second sidewall and the second end portion of the third sidewall meet at a fourth sidewall corner portion and define a fourth sidewall corner portion at a slant angle to adjacent portions of both the second and third sidewalls, and the corner aperture of the top rail fourth corner portion is positioned outward of fourth sidewall corner portion.

4. The chemical containment pan of claim 3, further including a drain fitting located at one of the first, second, third or fourth sidewall corner portion. [[and]] sized for draining chemicals within the interior fluid-tight container of the chemical containment pan.

5. The chemical containment pan of claim 1 for use with a side locking connector having two locking inserts, wherein the top rail portion of the first sidewall at a location between the first and second end portions of the top rail portion of the first sidewall has a first side aperture sized to removably receive one of the locking inserts of the side locking connector, the top rail portion of the second sidewall at a location between the first and second end portions of the top rail portion of the second sidewall has a second side aperture sized to removably receive one of the locking inserts of the side locking connector, the top rail portion of the third sidewall at a location between the first and second end portions of the top rail portion of the third sidewall has a third side aperture sized to removably receive one of the locking inserts of the side locking connector and the top rail portion of the fourth sidewall at a location between the first and second end portions of the top rail portion of the fourth sidewall has a fourth side aperture sized to removably receive one of the locking inserts of the side locking connector; and the chemical containment pan being constructed such that when the fourth sidewall of one of the chemical containment pans and the third sidewall of another one of the chemical containment pans are positioned adjacent to each other, the fourth side aperture of the one chemical containment pan and the third side aperture of the another chemical containment pan are positioned adjacent to each other for each to receive one of the two locking inserts of the side locking connector, or when the second sidewall of one of the chemical containment pans and the first sidewall of another one of the chemical containment pans are positioned adjacent to each other, the second side aperture of the one chemical containment pan and the first side aperture of the another chemical containment pan are positioned adjacent to each other in position to each receive one of the two locking inserts of the side locking connector.

6. The chemical containment pan of claim 5, wherein the first sidewall has an inwardly projecting first sidewall portion defining a first recess located below the first side aperture and outward of the first sidewall portion, the second sidewall has an inwardly projecting second sidewall portion defining a second recess located below the second side aperture and outward of the second sidewall portion, the third sidewall has an inwardly projecting third sidewall portion defining a third recess located below the third side aperture and outward of the third sidewall portion and the fourth sidewall has an inwardly projecting fourth sidewall portion defining a fourth recess located below the fourth side aperture and outward of the fourth sidewall portion.

7. The chemical containment pan of claim 1, wherein the first, second, third and fourth sidewalls and the bottom wall are made of at least one of polyurea, polyurethane and a blend of polyuria and plyurethane.

8. A chemical containment pan for use with a corner locking connector having two locking inserts, comprising:
a first sidewall having first and second end portions, and upper and lower portions;
a second sidewall opposite the first sidewall, the second sidewall having first and second end portions, and upper and lower portions;
a third sidewall having first and second end portions, and upper and lower portions, the third sidewall extending between the first end portion of the first sidewall and the first end portion of the second sidewall, the first end portion of the third sidewall being connected in fluid-tight arrangement to the first end portion of the first sidewall and the second end portion of the third sidewall being connected in fluid-tight arrangement to the first end portion of the second sidewall;
a fourth sidewall having first and second end portions, and upper and lower portions, the fourth sidewall extending between the second end portion of the first sidewall and the second end portion of the second sidewall, the first end portion of the fourth sidewall being connected in fluid-tight arrangement to the second end portion of the first sidewall and the second end portion of the fourth sidewall being connected in fluid-tight arrangement to the second end portion of the second sidewall;
a bottom wall in fluid-tight arrangement with the lower portions of the first, second, third and fourth sidewalls to define an interior fluid-tight container with an upward opening, open top defined by the upper portions of the first, second, third and fourth sidewalls;
the upper portions of each of the first, second, third and fourth walls having a top rail portion;
the first end portion of the top rail portion of the first sidewall and the first end portion of the top rail portion of the third sidewall defining a top rail first corner portion, the second end portion of the top rail portion of the first sidewall and the first end portion of the top rail portion of the fourth sidewall defining a top rail second corner portion, the second end portion of the top rail portion of the fourth sidewall and the second end portion of the top rail portion of the second sidewall defining a top rail third corner portion, and the first end portion of the top rail portion of the second sidewall and the second end portion of the top rail portion of the third sidewall defining a top rail fourth corner portion, each of the first, second, third and fourth corner portions having a corner aperture, each corner aperture being sized to removably receive one of the locking inserts of the corner locking connector; and the chemical containment pan being constructed such that when the fourth sidewall of one of the chemical containment pans and the third sidewall of another one of the chemical containment pans are positioned adjacent to each other, the corner apertures of the third corner portion of the one chemical containment pan and the fourth corner aperture of the second chemical containment pan are positioned adjacent to each other in position to each receive one of the two locking inserts of the corner locking connector, or when the second sidewall of one of the chemical containment pans and the first sidewall of another one of the chemical containment pans are positioned adjacent to each other, the corner apertures of the fourth corner portion of the one chemical containment pan and the first corner portion of the another chemical containment pan are positioned adjacent to each other in position to each receive one of the two locking inserts of the corner locking connector.

9. The chemical containment pan of claim 8, wherein the top rail portion of the second sidewall has a top rail extension portion with a downwardly extending outer flange portion and the top rail portion of the fourth sidewall has a top rail extension portion with a downwardly extending outer flange portion; and the chemical containment pan being constructed such that when the fourth sidewall of the first chemical containment pan and the third sidewall of the second chemical containment pan are positioned adjacent to each other, the second sidewall of the second chemical containment pan and the first sidewall of the third chemical containment pan are positioned adjacent to each other, the third sidewall of the third chemical containment pan and the fourth sidewall of the fourth chemical containment pan are positioned adjacent to each other and the first sidewall of the fourth chemical containment pan and the second sidewall of the first chemical containment pan are positioned adjacent to each other, the top rail extension portion of the fourth sidewall of the first chemical containment pan extends over the top rail portion of the third sidewall of the second chemical containment pan and the downwardly extending outer flange portion of the top rail extension portion of the fourth sidewall of the first chemical containment pan is position over the interior fluid-tight container of the second chemical containment pan, the top rail extension portion of the second sidewall of the second chemical containment pan extends over the top rail portion of the first sidewall of the third chemical containment pan and the downwardly extending outer flange portion of the top rail extension portion of the second sidewall of the second chemical containment pan is position over the interior fluid-tight container of the third chemical containment pan, the top rail extension portion of the fourth sidewall of the fourth chemical containment pan extends over the top rail portion of the third sidewall of the third chemical containment pan and the downwardly extending outer flange portion of the top rail extension portion of the fourth sidewall of the fourth chemical containment pan is position over the interior fluid-tight container of the third chemical containment pan and the top rail extension portion of the second sidewall of the first chemical containment pan extends over the top rail portion of the first sidewall of the fourth chemical containment pan and the downwardly extending outer flange portion of the top rail extension portion of the second sidewall of the first chemical containment pan is position over the interior fluid-tight container of the fourth chemical containment pan.

10. The chemical containment pan of claim 8, wherein the first end portion of the first sidewall and the first end portion of the third sidewall meet at a first sidewall corner portion and define a first sidewall corner portion at a slant angle to adjacent portions of both the first and third sidewalls, and the corner aperture of the top rail first corner portion is positioned outward of first sidewall corner portion, the second end portion of the first sidewall and the first end portion of the fourth sidewall meet at a second sidewall corner portion and define a second sidewall corner portion at a slant angle to adjacent portions of both the first and fourth sidewalls, and the corner aperture of the top rail second corner portion is positioned outward of second sidewall corner portion, the second end portion of the fourth sidewall and the second end portion of the second sidewall meet at a third sidewall corner portion and define a third sidewall corner portion at a slant angle to adjacent portions of both the fourth and second sidewalls, and the corner aperture of the top rail third corner portion is positioned outward of third sidewall corner portion, and the first end portion of the second sidewall and the second end portion of the third sidewall meet at a fourth sidewall corner portion and define a fourth sidewall corner portion at a slant angle to adjacent portions of both the second and third sidewalls, and the corner aperture of the top rail fourth corner portion is positioned outward of fourth sidewall corner portion.

11. The chemical containment pan of claim 10, further including a drain fitting located at one of the first, second, third or fourth sidewall corner portion, sized for draining chemicals within the interior fluid-tight container of the chemical containment pan.

12. The chemical containment pan of claim 8 for use with a side locking connector having two locking inserts, wherein the top rail portion of the first sidewall at a location between the first and second end portions of the top rail portion of the first sidewall has a first side aperture sized to removably receive one of the locking inserts of the side locking connector, the top rail portion of the second sidewall at a location between the first and second end portions of the top rail portion of the second sidewall has a second side aperture sized to removably receive one of the locking inserts of the side locking connector, the top rail portion of the third sidewall at a location between the first and second end portions of the top rail portion of the third sidewall has a third side aperture sized to removably receive one of the locking inserts of the side locking connector and the top rail portion of the fourth sidewall at a location between the first and second end portions of the top rail portion of the fourth sidewall has a fourth side aperture sized to removably receive one of the locking inserts of the side locking connector; and the chemical containment pan being constructed such that when the fourth sidewall of one of the chemical containment pans and the third sidewall of another one of the chemical containment pans are positioned adjacent to each other, the fourth side aperture of the one chemical containment pan and the third side aperture of the another chemical containment pan are positioned adjacent to each other in position to each receive one of the two locking inserts of the side locking connector, or when the second sidewall of one of the chemical containment pans and the first sidewall of another one of the chemical containment pans are positioned adjacent to each other, the second side aperture of the one chemical containment pan and the first side aperture of the another chemical containment pan are positioned adjacent to each other in position to each receive one of the two locking inserts of the side locking connector.

13. The chemical containment pan of claim 12, wherein the first sidewall has an inwardly projecting first sidewall portion defining a first recess located below the first side aperture and outward of the first sidewall portion, the second sidewall has an inwardly projecting second sidewall portion defining a second recess located below the second side aperture and outward of the second sidewall portion, the third sidewall has an inwardly projecting third sidewall portion defining a third recess located below the third side aperture and outward of the third sidewall portion and the fourth sidewall has an inwardly projecting fourth sidewall portion defining a fourth recess located below the fourth side aperture and outward of the fourth sidewall portion.

14. The chemical containment pan of claim 8, wherein the first, second, third and fourth sidewalls and the bottom wall are made of at least one of polyurea, polyurethane and a blend of polyuria and plyurethane.

15. A chemical containment pan system, comprising:
a corner locking connector having four locking inserts;
a first sidewall having first and second end portions, and upper and lower portions;
a second sidewall opposite the first sidewall, the second sidewall having first and second end portions, and upper and lower portions;
a third sidewall having first and second end portions, and upper and lower portions, the third sidewall extending between the first end portion of the first sidewall and the first end portion of the second sidewall, the first end portion of the third sidewall being connected in fluid-tight arrangement to the first end portion of the first sidewall and the second end portion of the third sidewall being connected in fluid-tight arrangement to the first end portion of the second sidewall;
a fourth sidewall having first and second end portions, and upper and lower portions, the fourth sidewall extending between the second end portion of the first sidewall and the second end portion of the second sidewall, the first end portion of the fourth sidewall being connected in fluid-tight arrangement to the second end portion of the first sidewall and the second end portion of the fourth sidewall being connected in fluid-tight arrangement to the second end portion of the second sidewall;
a bottom wall in fluid-tight arrangement with the lower portions of the first, second, third and fourth sidewalls to define an interior fluid-tight container with an upward opening, open top defined by the upper portions of the first, second, third and fourth sidewalls;
the upper portions of each of the first, second, third and fourth walls having a top rail portion;
the first end portion of the top rail portion of the first sidewall and the first end portion of the top rail portion of the third sidewall defining a top rail first corner portion, the second end portion of the top rail portion of the first sidewall and the first end portion of the top rail portion of the fourth sidewall defining a top rail second corner portion, the second end portion of the top rail portion of the fourth sidewall and the second end portion of the top rail portion of the second sidewall defining a top rail third corner portion, and the first end portion of the top rail portion of the second sidewall and the second end portion of the top rail portion of the third sidewall defining a top rail fourth corner portion, each of the first, second, third and fourth corner portions having a corner aperture, each corner aperture being sized to removably receive one of the locking inserts of the corner locking connector; and
the chemical containment pan being constructed such that when the fourth sidewall a first chemical containment pan and the third sidewall of a second chemical containment pan are positioned adjacent to each other, the second sidewall of the second chemical containment pan and a first sidewall of a third chemical containment pan are positioned adjacent to each other, the third sidewall of the third chemical containment pan and the fourth sidewall of a fourth chemical containment pan are positioned adjacent to each other and the first sidewall of the fourth chemical containment pan and the second sidewall of the first chemical containment pan are positioned adjacent to each other, the corner apertures of the third corner portion of the first chemical containment pan, the fourth corner portion of the second chemical containment pan, the first corner portion of the third chemical containment pan and the second corner portion of the fourth chemical containment pan are positioned adjacent to each other in position to each receive one of the four locking inserts of the corner locking connector.

* * * * *